(12) United States Patent
Martin et al.

(10) Patent No.: US 6,329,476 B1
(45) Date of Patent: *Dec. 11, 2001

(54) OLEFIN POLYMERIZATION PROCESSES AND PRODUCTS THEREOF

(75) Inventors: Joel L. Martin; Joseph J. Bergmeister; Eric T. Hsieh; Max P. McDaniel; Elizabeth A. Benham; Steven J. Secora, all of Bartlesville, OK (US)

(73) Assignee: Phillips Petroleum Company, Bartlesville, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,303

(22) Filed: Oct. 14, 1997

(51) Int. Cl.[7] ................ C08F 2/06; C08F 10/14
(52) U.S. Cl. ................ 526/64; 526/72; 526/81; 526/86; 526/112; 526/124.2; 526/128.1; 526/65; 526/154; 526/348.5; 526/352; 502/127
(58) Field of Search ................ 526/64, 72, 112, 526/154, 124.2, 125.1, 348.5, 352, 81, 86, 97, 127; 502/127

(56) References Cited

U.S. PATENT DOCUMENTS

| | | | |
|---|---|---|---|
| 3,969,386 | 7/1976 | Ballard et al. | 260/429 R |
| 4,056,669 | 11/1977 | Ballard et al. | 526/154 |
| 4,544,647 | 10/1985 | Fuentes, Jr. et al. | 502/115 |
| 4,559,318 | 12/1985 | Smith et al. | 502/110 |
| 4,803,253 | 2/1989 | McDaniel et al. | 526/352.2 |
| 4,816,433 | * 3/1989 | Terano et al. | 502/127 |
| 4,923,935 | 5/1990 | Sano et al. | 526/73 |
| 4,972,035 | * 11/1990 | Suga et al. | 526/125 |
| 4,975,485 | 12/1990 | Sato et al. | 525/53 |
| 5,210,161 | 5/1993 | Smith et al. | 526/129 |
| 5,266,666 | 11/1993 | Kamiishi et al. | 526/125 |
| 5,322,910 | 6/1994 | An-hsiang Wu | 526/107 |
| 5,401,820 | 3/1995 | McDaniel et al. | 526/348.5 |
| 5,500,397 | 3/1996 | Cuffiani et al. | 502/102 |
| 5,639,834 | * 6/1997 | Debras et al. | 526/64 |

FOREIGN PATENT DOCUMENTS 1314828   4/1973   (GB).

OTHER PUBLICATIONS

Polymer Technology Dictionary, T. Whealan 1–st edition, p. 395, Feb. 1999.*
Chemical Engineers Handbook, 3–d edition, McGraw–Hill Book Company, p. 905, Feb. 1999.*
Ballard, D.G.H., Transition Metal Alkyl Compounds as Polymerization Catalysts, *Journal of Polymer Science*, vol. 13, pp. 2191–2212 (1975).

* cited by examiner

*Primary Examiner*—David W. Wu
*Assistant Examiner*—Tanya Zalukawa
(74) *Attorney, Agent, or Firm*—Edward L. Bowman

(57) ABSTRACT

A novel loop/slurry olefin polymerization process is provided which produces ultra high molecular weight ethylene homopolymers and ultra high molecular weight ethylene copolymers. Catalyst systems used are selected from the group consisting of inorganic oxide supported titanium-containing catalyst systems, inorganic oxide supported organo-zirconium catalyst systems and inorganic oxide supported organo-hafnium catalyst systems.

20 Claims, 1 Drawing Sheet

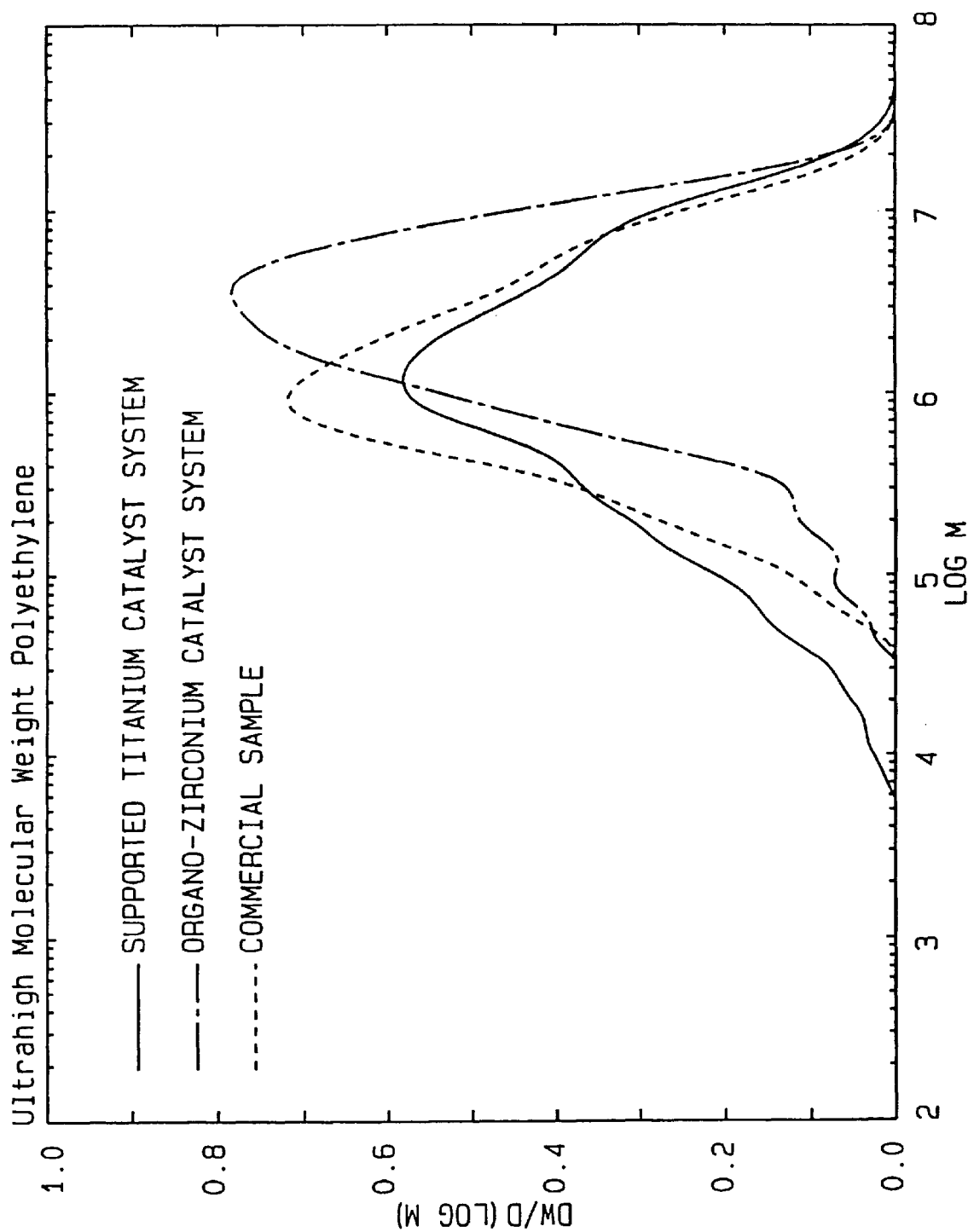

OLEFIN POLYMERIZATION PROCESSES AND PRODUCTS THEREOF

BACKGROUND

This invention relates to olefin polymerization processes and the resultant polymer products.

Ultra high molecular weight olefin polymers such as polyethylene usually have excellent properties, such as, for example, high impact strength and dimensional stability, low coefficient of friction, self-lubricating and are highly resistant to most chemicals. Thus, ultrahigh molecular weight polyethylenes are useful in many demanding and extremely critical applications, such as human joint replacements, gears, bullet proof vests, skis, and other applications. However, ultrahigh molecular weight polyethylenes can be difficult to process with conventional equipment. Since ultra high molecular weight polymer cannot be pelletized after leaving the reactor, the polymer must be sold as a fluff or a powder. Therefore, particle size and toughness of the resultant polymer is critical.

Many commercial methods are available to produce olefin polymers, such as polyethylene. One of the most economical routes to most commercial grades of olefin polymers is a loop/slurry process with a paraffin diluent wherein the polymerization process can be carried out at a temperature low enough that the resulting polymer is largely insoluble in the diluent. It is believed that commercially acceptable ultra high molecular weight ethylene polymers traditionally are made using a stirred tank process, in a heavy hydrocarbon diluent.

SUMMARY OF THE INVENTION

It is an object of this invention to provide very tough ultra high molecular weight homopolymers of ethylene and copolymers of ethylene/1-hexene.

It is another object of this invention to provide ultra high molecular weight ethylene/1-hexene copolymers having improved physical properties compared to conventional ultra high molecular weight ethylene homopolymers.

It is a further object of this invention to provide an improved olefin polymerization process which can produce both homopolymers of ethylene and copolymers of ethylene and at least one other higher alpha-olefin comonomer.

It is yet another object of this invention to provide an improved polymerization process for preparing ultra high molecular weight polyethylene.

It is a further object of this invention to provide an improved olefin polymerization process which can produce copolymers of ethylene and at least one other higher alpha-olefin comonomer using a catalyst system selected from the group comprising supported Ziegler-Natta catalyst systems, organo-zirconium catalyst systems and organo-hafnium catalyst systems.

It is a further object of this invention to provide an improved olefin polymerization process which can produce homopolymers of ethylene using a catalyst system selected from the group comprising organo-zirconium catalyst systems and organo-hafnium catalyst systems.

In accordance with one embodiment of this invention, a process is provided which comprises polymerizing ethylene in a loop/slurry process using a catalyst system selected from the group comprising supported Ziegler-Natta catalyst systems, organo-zirconium catalyst systems and organo-hafnium catalyst systems to produce very tough ultra high molecular weight copolymers of ethylene and at least one other higher alpha-olefin comonomer.

In accordance with another embodiment of this invention, a process is provided which comprises polymerizing ethylene in a loop/slurry process using a catalyst system selected from the group comprising supported organo-zirconium catalyst systems and organo-hafnium catalyst systems to produce very tough ultra high molecular weight homopolymers of ethylene.

In accordance with still another embodiment of this invention, a process is provided which consists essentially of polymerizing ethylene in a loop/slurry process using a catalyst system selected from the group comprising supported Ziegler-Natta catalyst systems, organo-zirconium catalyst systems and organo-hafnium catalyst systems to produce very tough ultra high molecular weight copolymers of ethylene and at least one other higher alpha-olefin comonomer.

In accordance with still another embodiment of this invention, a process is provided which consists essentially of polymerizing ethylene in a loop/slurry process using a catalyst system selected from the group comprising supported organo-zirconium catalyst systems and organo-hafnium catalyst systems to produce very tough ultra high molecular weight homopolymers of ethylene.

In accordance with yet another embodiment of this invention, a composition comprising a very tough, ultra high molecular weight polyethylene is provided.

DESCRIPTION OF THE DRAWINGS

FIG. 1 shows three (3) molecular weight distributions obtained from size exclusion chromatography (SEC) of three different polyethylene samples. "UHMWPE" designates ultra high molecular weight polyethylene. The x-axis, labeled "LOG M", is the log of the polyethylene molecular weight. The y-axis, labeled "DW/D(LOG M)", is the differential mass fraction. Two curves, designated as "Supported Titanium Catalyst System" and "Organo-zirconium Catalyst System", are curves of ethylene/1-hexene copolymers prepared in accordance with the novel, inventive process. The third curve, designated as "Commercial Sample," is a commercially available polyethylene, GUR 4150 made by Hoechst Celanese USA.

DESCRIPTION OF THE PREFERRED EMBODIMENTS

As used in this disclosure, the term "polymer" includes both homopolymers and copolymers, even though the terms "homopolymer" and "copolymer" are used in the specification. However, the specific term "homopolymer" means a polymer that is produced from predominantly one olefin monomer, such as, for example, ethylene. The specific term "copolymer" means a polymer that is produced from predominantly one olefin and another higher alpha-olefin, such as for example, copolymers of ethylene and butene, ethylene and hexene, ethylene and octene.

Catalyst System

Three types of catalyst systems can be used in accordance with this invention to produce ultra-high molecular weight polymers. The first type of catalyst system useful in this invention is an inorganic oxide-supported titanium-containing catalyst system, commonly referred to as "Ziegler-Natta" catalysts. As used in this disclosure, the term "support" refers to a carrier for another catalytic component. However, by no means, is a support an inert material; it is possible that a support can contribute to catalytic activity and selectivity. Commercially available titanium catalyst systems typically comprise complexes of titanium halides with organometallic compounds, such as aluminum alkyls. Exemplary magnesium/titanium catalyst systems include, but are not limited to, those disclosed in U.S. Pat. Nos. 4,394,291; 4,326,988; and 4,347,158, herein incorporated by reference. Exemplary inorganic oxide catalyst system supports include, but are not limited to, either alone or in combination, inorganic oxides of silica, alumina and/or titania, phosphated inorganic oxides, and mixtures thereof. Particularly preferred supports for the titanium-type catalyst system are selected from the group consisting of silica, silica-alumina, alumina, flourided alumina, silated alumina, thoria, aluminophosphate, aluminum phosphate, phosphated silica, phosphated alumina, silica-titania, coprecipitated silica/titania, fluorided/silated alumina, and mixtures thereof. Preferably, the titanium-type catalyst system support comprises silica, titania, and alumina, either alone or in combination and either modified or unmodified.

The two other types of catalyst systems useful in the present invention are selected from the group consisting of organo-zirconium and organo-hafnium catalyst systems which have beta-stable ligand(s). The organo-zirconium and organo-hafnium catalyst systems must be supported on an aluminum-containing support.

The organo-zirconium and organo-hafnium catalyst systems comprise a supported, beta($\beta$)-stabilized Group IVB (Chemical Abstracts Service version of the Periodic Table) compound. Alkyl compounds of Group IVB metals can readily eliminate a hydrogen through a mechanism referred to as beta-hydride elimination, shown below in Equation 1.

Equation 1:

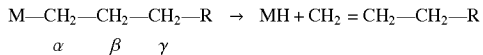

wherein $\alpha$ = alpha, $\beta$ = beta, $\gamma$ = gamma

Beta-stabilized compounds are inherently more stable then those compounds which contain β-hydrogens. During an elimination reaction, a β-hydrogen on the ligand is transferred to the metal and an alkene compound is eliminated. One way to deter this elimination reaction is to use ligands that have no β-hydrogens. Exemplary β-stabilized compounds can have a general formula of $CH_2X(R)_3$, wherein X is selected from the group consisting of carbon, silicon, germanium, tin and lead and wherein R can be the same or different and is selected from the group consisting of saturated or unsaturated hydrocarbons. Preferably, R is selected from the group consisting of alkyl radicals of from about 4 to about 12 carbon atoms, alicyclic radicals of from about 4 to about 12 carbon atoms, aryl radicals of from about 6 to about 24 carbon atoms and hydrocarbyl substituted aryl radicals such as alkylaryl and cycloalkylaryl of from about 6 to about 24 carbon atoms. Exemplary compounds having a general formula of $MR_4$ wherein M is selected from the group consisting of titanium, zirconium and hafnium and R can be the same or different and is selected from the group consisting of —$CH_2C(CH_3)_3$, -benzyl, and —$CH_2SiMe_3$. Exemplary beta stable ligands include, but are not limited to, benzyl, trimethylsilylmethyl (TMSM), 1-methylene-1-naphthyl and neopentyl.

Zirconium or hafnium usually is present in the catalyst system in an amount within a range of about 0.01 to about 6 weight percent, preferably within a range of about 0.1 to about 5 weight percent, based on the total mass of the catalyst system (support plus zirconium or hafnium metal). Most preferably, zirconium or hafnium is present in the catalyst system in an amount within a range of 0.2 to 4 weight percent based on the total mass of the catalyst system for best catalyst system activity and productivity, as well as best polymer product particle size.

Any aluminum-containing support useful to support organo-zirconium and organo-hafnium catalyst systems can be used. Exemplary catalyst supports include, but are not limited to, inorganic oxides, either alone or in combination, and mixtures thereof. As stated earlier, the support must contain aluminum. Exemplary supports for the organo-zirconium and organo-hafnium catalyst systems are selected from the group consisting of alumina ($Al_2O_3$), flourided alumina, silated alumina, flourided/silated alumina, aluminophosphate, aluminum phosphate, phosphated alumina, silica/alumina, and mixtures of two or more thereof. Preferred supports are selected from the group consisting of alumina, aluminophosphate and silica alumina. Most preferably, any grade or designation or type of alumina, with a minor amount of silica, preferably, less than 10 weight percent, most preferably, less than 6 weight percent, is used as a catalyst system support for best resultant catalyst system activity.

Supports with high pore volume and high surface area are preferred. Alumina supports having higher surface areas and pore volumes, used in accordance with this invention, can result in catalyst systems having higher catalyst system activity and productivity. Generally, aluminum-containing supports useful in this invention have a surface area of greater or equal to about 150 $m^2$/gram, preferably greater than about 200 $m^2$/gram, and a pore volume of greater than or equal to about 0.7 cc/g, preferably greater than about 1.5 cc/g. Most preferably, aluminum-containing supports useful in this invention have a surface area within a range of 300 to 600 $m^2$/gram and a pore volume within a range of 1.8 to 4 cc/g.

The particle size of the polymer fluff is critical. In accordance with this invention, it has been found that a correct selection of particle size of the catalyst system particles can control the particle size of the resultant polymer fluff. Usually, supported catalyst system particles are within a range of about 1 to about 40 microns, preferably within a range of about 2 to about 20 microns. Most preferably, in order to have a correctly sized polymer product, catalyst particles are kept within a size range of about 4 to about 16 microns.

Preferably, a cocatalyst, such as, for example, aluminum alkyl and/or boron alkyl compounds, is not used during polymerization with the organo-zirconium or organo-hafnium catalyst systems. The presence of these common cocatalysts does not appear to enhance catalyst system activity or productivity and can, in fact, reduce catalyst system activity and productivity.

Reactants

The polymers produced in accordance with the process of this invention are homopolymers of ethylene and copolymers of ethylene and higher alpha-olefin comonomers. The present invention is unique in that copolymers of ethylene and higher alpha-olefin comonomers have ultra high molecular weight. Preferably, the ethylene concentration in the polymerization reactor is within a range of from about 2 weight percent to about 20 weight percent, based on the total liquid contents of the reactor. Most preferably, the ethylene concentration in the polymerization reactor is within a range of from about 4 to about 15 weight percent. Measured in another manner, ethylene concentration in the polymerization reactor flash gas is within a range of from about 5 weight percent to about 12 weight percent. Most preferably, the ethylene concentration in the polymerization reactor flash gas is within a range of from about 6.5 to about 10 weight percent. While ethylene concentration does not significantly affect the molecular weight of the resultant polymer, higher or lower ethylene concentration can effect catalyst activity.

The alpha-olefin comonomers used in the present invention must be selected from the group consisting of 1-butene, 1-hexene, and mixtures thereof in order to produce a copolymer with desirable properties as well as ease of use in a loop/slurry polymerization reaction process. The most preferred comonomer is 1-hexene to produce a copolymer with the best product properties. If a comonomer is present during polymerization, the comonomer concentration in the polymerization reactor is within a range of from about 0.5 to about 20 mole percent. Most preferably, comonomer is present within a range of about 1 to about 15 weight percent.

Polymerization Process

Polymerization of the olefin monomer(s) must be carried out under loop/slurry polymerization conditions wherein the temperature is kept below the temperature at which polymer swells. Such polymerization techniques are well known in the art and are disclosed, for instance, in Norwood, U.S. Pat. No. 3,248,179, the disclosure of which is herein incorporated by reference. A light diluent, loop polymerization process is much more preferred than a stirred tank reactor because a stirred tank cannot contain isobutane, which is necessary to produce other commercially popular high density polyethylene polymer product grades. A loop reactor also has an advantage in that isobutane diluent can be flashed off in a loop process, eliminating the necessity of separating polymer product from solvent. Additionally, the greater heat transfer surface of a loop reactor offers much more versatility for plant operation, and often less polymer swelling during polymerization.

The temperature of the polymerization reactor, or reaction zone, according to this invention, is critical and is dependant on the type of catalyst system employed. Polymerization reaction temperatures with a Ziegler-Natta catalyst system must be kept within a range of about 150° F. to about 180° F. (65° C. to 83° C.), preferably within a range of about 160° F. to about 170° F. (71° C. to 77° C.). Most preferably, the reaction zone temperature is within a range of 162° F. to 168° F. (72° C. to 76° C.). Polymerization reaction temperatures with a zirconium- or hafnium-containing catalyst system must be kept within a range of about 158° F. to about 212° F. (70° C. to 100° C.), preferably within a range of about 167° F. to about 203° F. (75° C. to 95° C.). Most preferably, the reaction zone temperature is within a range of 176° F. to 194° F. (80° C. to 90° C.). The temperature range is critical in order to produce an ultra high molecular weight polyethylene. Too high of a reactor temperature can produce a polymer with too low of a molecular weight; too low of a reactor temperature can make the polymerization process inoperable because a lower reactor temperature can be difficult to maintain due to the exothermic polymerization reaction, flashing off reactor diluent can be difficult, and can produce a polymer with a commercially unacceptable molecular weight.

The loop/slurry process used in this invention must be carried out in an inert, light hydrocarbon diluent (medium), selected from the group consisting of hydrocarbons having three or four carbon atoms per molecule. Exemplary diluents include, but are not limited to propane, n-butane, isobutane, and mixtures thereof. Diluents having greater or less than three or four carbon atoms per molecule can be difficult to separate from the polymer product during the polymer recovery process. Isobutane is the most preferred diluent due to low cost and ease of use.

Pressures in the loop/slurry process can vary from about 110 to about 1000 psig (0.76–4.8 MPa) or higher, preferably 350 to 600 psig. The catalyst system is kept in suspension and is contacted with ethylene at a sufficient pressure to maintain the medium and at least a portion of the ethylene in a liquid phase. The reactor medium and temperature thus are selected such that the polymer is produced and recovered as solid particles. Catalyst system concentrations in the reactor can be such that the catalyst system content ranges from 0.0001 to about 0.1 weight percent based, on the weight of the reactor contents.

Hydrogen never is added to the polymerization reactor because hydrogen has too great of an effect on the molecular weight of the resultant polymer.

Products

Polymers produced in accordance with this invention are homopolymers of ethylene and copolymers of ethylene and higher alpha-olefin comonomers. Polymers produced according to this invention have an ultra high weight average ($M_w$) molecular weight, generally above one million (1,000,000). Preferably, polymers produced in accordance with this invention have a molecular weight within a range of greater than about two million (2,000,000) and most preferably, within a range of greater than or equal to about 3,000,000 up to about 10,000,000.

Comonomer incorporation into the inventive copolymers usually is within a range of about 0.05 to about 10 weight percent comonomer, preferably within a range of about 0.07 to about 5 weight percent. Preferably, comonomer is present in the copolymer within a range of 0.15 to 2 weight percent for best resultant copolymer properties. Expressed in different terms, the inventive copolymers usually comprise comonomer within a range of about 0.015 to about 3.5 mole percent comonomer, preferably within a range of about 0.023 to about 1.7 weight percent. Preferably, comonomer is present in the copolymer within a range of 0.5 to 0.7 weight percent for best resultant copolymer properties.

Since the molecular weight of these polymers is so high, the polymers will exhibit a value of zero (0) for both the melt index (MI) and high load melt index (HLMI). The inherent viscosity (IV) of the polymers generally is greater than about 19, preferably within a range of about 20 to about 30. Most preferably, the polymers will have an IV within a range of 22 to 28.

The density of these novel polymers usually is within a range of about 0.91 g/cc to about 0.95 g/cc, preferably from about 0.92 to about 0.94 g/cc. Most preferably, the polymer density is within a range of about 0.925 to about 0.935 g/cc.

Another critical, defining physical characteristic of these polymers is the fluff, or powder, particle size. Usually, the particle size is less than about 400 microns (40 mesh), preferably within a range of about 400 microns to about 40 microns (300 mesh). Most preferably, the particle size is within a range of about 50 to about 400 microns. Particle sizes of larger that about 400 microns often can appear in the finished product as a flaw, or a white patch. While not wishing to be bound by theory, it is believed that this defect appears because the particles are not molded by typical methods in the art, but are merely fused together by compression. Fine, or small, particles can inhibit transport of the powder through conveyor blowers because the fine particles can cling to walls by static and can plug downstream filters due to blowover.

Polymers produced according to this invention must be very tough, as evidenced by a sand wheel abrasion test, tensile strength, elongation, flexural modulus, hardness and Izod impact strength. The most important of these tests is the sand wheel abrasion test wherein a plaque of compression molded polymer is subjected to sanding and the amount of polymer lost is measured. Generally, the compression molded polymer sample loss is less than or equal to about 150 grams, preferably, less than about 140 grams. Most preferably, the compression molded polymer sample loses between zero (0) and 125 grams.

Polymer tensile strength at yield is within a range of about 15 to about 30 MPa, preferably, within a range of about 19 to about 24 MPa. Most preferably, as an indicator of toughness, the tensile strength at yield is within a range of 20 to 24 MPa. Tensile strength at break usually is greater or equal to about 30 MPa, preferably greater than about 35 MPa. Most preferably, as an indicator of toughness, the tensile strength at break is greater than 38 and less than 75 MPa.

Izod impact usually is greater or equal to about 45 kJ/m$^2$, preferably greater than about 50 kJ/m$^2$. Most preferably, as another indicator of toughness, the Izod impact is within a range of about 55 to about 200 kJ/m$^2$. Izod impact is not only related to the polymer itself, but also is an indicator of how well the polymer particles fuse, or knit, together during the fusion process. Polymers having too high a molecular weight can have poor Izod impact strength because of poor fusion. Thus, Izod impact strength often can go through a maximum as molecular weight is increased.

Another critical property of these novel, ultra high molecular weight polymers includes physical appearance, such as cleanliness and whiteness. High bulk density also is important because bulk density is related to the amount of compression of the polymer during fusion. A low bulk density can inhibit and slow down processing rates. Generally, polymers produced in accordance with this invention have a bulk density of greater than about 0.1 g/cc, preferably, greater than about 0.15 g/cc. Most preferably, polymer bulk density is within a range of 0.25 to 1 g/cc.

A further understanding of the present invention and its advantages are provided by reference to the following examples.

EXAMPLES

Example 1

Ethylene homopolymers and copolymers were prepared under batch particle form process conditions by contacting the catalyst system with ethylene and optionally a comonomer in a 2.3 liter, jacketed, bench scale autoclave reactor. Isobutane was the diluent; hydrogen and/or comonomer were added to the reactor for some of the runs. The reactor was operated for a time of 60–75 minutes. Reactor temperature was 194° F. (90° C.), unless stated differently, and total reactor pressure (isobutane plus ethylene) was 3.8 MPa (550 psig). Polymer fluff was removed from the reactor following polymerization for analysis. The catalyst systems used were prepared as described below; some were prepared in-situ in the reactor and some were prepared external to the reactor. Catalyst systems used in the Examples had an average particle size of 10 microns. Cocatalyst was not present during polymerization in Example 1.

Zirconium tetrakis(trimethylsilylmethyl) (Zr(TMSM)$_4$) and hafnium tetrakis(trimethylsilylmethyl) (Hf(TMSM)$_4$) were prepared in a manner similar to that taught by M. R. Collier, M. F. Lappert and R. Pearce in *Silylmethyl and Related Complexes: Part 1. Kinetically Stable Alkyls of Titanium(IV), Zirconium(IV) and Hafnium (IV)*; J. C. S. Dalt. Trans (pp. 445–451, 1973), herein incorporated by reference, using toluene as a catalyst system preparation reaction solvent. All reagents were handled under an inert (nitrogen) atmosphere. 1.08 mmol. "0.252 g". zirconium (IV)chloride or was slurried with 96 ml toluene and cooled to –78° C. Then, 4.4 ml of 1.0M Li(TMSM) in pentane was added; the solution was kept at –78° C. and stirred for one hour. During the second hour, the solution was stirred and brought to room temperature. A precipitate settled and a faint yellow solution was removed. Assuming 100% reaction, the solution had a theoretical concentration of 1 mg Zr/ml. Hf(TMSM)$_4$ was prepared in a similar manner to yield 1 mg Hf/ml.

Alumina catalyst system supports were either Ketjen-G (Al$_2$O$_3$), having a surface area of about 340 m$^2$/gram and a pore volume of about 2.1 cc/g, comprises about 0.5 weight percent silica and is commercially available from Akzo, or SRSII (Al$_2$O$_3$), commercially available from Grace-Davison and which comprises about six (6) weight percent silica. The supports were screened through a 325 mesh (50 $\mu$m opening) screen; the smaller particle size fraction (higher screen number ) was retained for use. After screening, catalyst supports were calcined at 600° C. in air.

In-situ catalyst systems were prepared by adding 50 to 100 mg screened and calcined alumina support to the reactor against a counter current of isobutane. The reactor was sealed and half the isobutane was added; the stirrer was started. The desired organometallic compound was added to the reactor with the other half of the isobutane. If used, 1-hexene was added concurrently with ethylene. The reactor was brought to pressure and ethylene was fed on demand. Ethylene concentration in the reactor in Runs 101–105 was 14 weight percent.

Externally prepared, supported catalyst systems were made by slurrying 7.7 g of screened, calcined in 50 ml of heptane, followed by addition of 7.7 ml of a 11 mg Zr/ml solution of Zr(TMSM)$_4$. The slurry was stirred for 10 minutes, the solid was recovered and washed twice with 50 ml heptane. A portion of the slurry was removed and dried at 100° C. under a stream of nitrogen to give a free-flowing powder. Polymerization with externally prepared catalyst systems was the same as catalyst systems prepared in-situ, except that supported catalyst system was fed to the reactor in lieu of catalyst support only.

Polymer product was collected from each run and passed through a 40 (U.S.) mesh (400 micron) screen to remove large particles. Sieved samples were compression molded and tested according to the following procedures:

Density (g/ml): ASTM D 1505–68 and ASTM D 1928, Condition C. Determined on a compression molded sample, cooled at about 15° C. per minute, and conditioned at room temperature for about 40 hours.

High Load Melt Index (HLMI)(g/10 min): ASTM D1238–95, condition E, determined at 190° C. with a 21,600 gram weight.

Bulk Density (lbs/ft$^3$): ASTM D1895-89.

Tensile Strength ((MPa): ASTM D638-86.

Elongation (%): ASTM D638-86.

Izod Impact, notched (kJ/m$^2$): ASTM D256(a)-84.

Flexural Modulus (MPa): ASTM D790-95a.

Tensile Impact (kJ/m$^2$): ASTM D1822-89.

Sand Wheel Abrasion (grams lost, g): ASTM D65-94. Lower values are more desirable, as an indication of resistance to abrasion.

Shore D Hardness: ASTM D2240-86.

Intrinsic Viscosity (dl/g): Calculated from molecular weight distribution using Mark-Houwink constants appropriate for polyethylene in 1,2,4-trichlorobenzene. ASTM D4020-92 procedure includes a definition of ultrahigh molecular weight polymers.

Molecular Weight Distribution: Molecular weights and molecular weight distributions were obtained using a Waters 150 CV gel permeation chromatograph with trichlorobenzene (TCB) as the solvent, with a flow rate of 1 mL/minute at a temperature of 140° C. BHT (2,6-di-tert-butyl-4-methylphenol) at a concentration of 1.0 g/L was used as a stabilizer in the TCB. An injection volume of 220 µL was used with a nominal polymer concentration of 0.3 g/L (at room temperature). Dissolution of the sample in stabilized TCB was carried out by heating at 160–170° C. for 20 hours with occasional, gentle agitation. The column was made using two Waters HT-6E columns (7.8×300 mm). The columns were calibrated with a broad linear polyethylene standard (Phillips Marlex® BHB 5003) for which the molecular weight had been determined.

Polymer properties are given in Table 1.

Example 2

Catalyst systems were prepared as described in Example 1, except that the faint yellow zirconium or hafnium solutions, assuming 100% reaction, had a concentration of 10 mg Zr/ml or 10 mg Hf/ml prior to the addition of the alumina support. These higher concentration solutions minimized the actual quantity of catalyst system added to the reactor. Polymerization was carried out in a continuous particle form process by contacting catalyst system with ethylene, employing a liquid full loop reactor, having a volume of 23 gallons (87 liters), isobutane as the diluent; no hydrogen was added to the reactor during Run 201. 1-Hexene comonomer was added to Run 202 to have a flash gas concentration of 0.64 mole percent (1 weight percent). The reactor was operated to have a residence time of about 1.25 hrs. The reactor temperature was 194° F. (90° C.) for Run 201 (homopolymer) and 185° F. (85° C.) for Run 202 (copolymer), and the pressure was 530 psig. At steady state conditions, the isobutane feed rate was about 51 l/hr, the ethylene feed rate was about 23 lbs/hr, with a reactor ethylene concentration of about 16 mole percent. Polymer was removed from the reactor at the rate of 22 lbs/hr. The sieved product was blended with 0.4 weight percent, based on the weight of polymer, calcium stearate (Ca St) by tumbling. All other variables remained constant. The results are given in Table 2. Particle size analyses are given in Table 3.

TABLE 1

| Run | 101 | 102 | 103 | 104 | 105 |
|---|---|---|---|---|---|
| Catalyst System | Zr(TMSM)$_4$ | Zr(TMSM)$_4$ | Zr(TMSM)$_4$ | Zr(TMSM)$_4$ | Zr(TMSM)$_4$ |
| 1-Hexene added (g) | 0 | 20 | 60 | 0 | 60 |
| Reactor Temp., ° C. | 90 | 90 | 90 | 75 | 75 |
| Reactor Pressure, psig | 550 | 550 | 550 | 375 | 375 |
| Density (g/cc) | 0.929 | 0.930 | 0.927 | 0.930 | 0.927 |
| 1-Hexene Content[a] | N/A | 0.07 mole % 0.2 wt % | N/A | N/A | N/A |
| Tensile Strength (MPa) | 45.3 | 56.5 | 64.4 | 65.4 | 58.8 |
| Tensile Yield (MPa) | 22.8 | 20.5 | 19.1 | 22.4 | 21.6 |
| Elongation (%) | 246 | 226 | 290 | 214 | 253 |
| Sand Wheel Abrasion (g) | 64 | 62 | 75 | 75 | 61 |
| Izod Impact (kJ/m$^2$) | 91 | 91 | 85 | 72 | 83 |
| Shore D Hardness | 68 | 67 | 68 | 70 | 69 |

[a]Sample analyzed by NMR spectroscopy

The data in Table 1 show that even with the addition of 1-hexene, density drops only very slightly, about 0.002 or 0.003 g/cc. However, the amount of 1-hexene added to Runs 202, 203, and 205, based on typical loop/slurry operating results, usually is enough to move the density at least 0.02 or 0.03 g/cc. Second, usually incorporation of 1-hexene almost always lowers the molecular weight of the resultant polymer. Thus, the copolymers produced in Runs 202, 203 and 205 are being compared to homopolymers at a higher molecular weight. Nearly all of the polymer properties (aside from those actually improved by the additions of 1-hexene) are still quite similar to homopolymers.

Size exclusion chromatography (SEC) results are shown in FIG. I. The curve designated as "Organo-Zirconium Catalyst System" is the for ethylene/1-hexene copolymer product made in Run 103. This sample, analyzed by SEC, had a weight average molecular weight (M$_w$) of about 3,820,000, a number average molecular weight (M$_n$) of about 915,000 and a calculated IV of about 21.7 dl/g. Note that the curve designated as a "Commercial Sample" had a similar SEC curve as that of the Supported Titanium Catalyst System sample.

TABLE 2

| Property | Run 201 (homopolymer) | Run 202 (copolymer) | Commercial Sample A[a] | Commercial Sample B[b] |
|---|---|---|---|---|
| Density, g/cc | 0.930 | 0.929 | 0.932 | 0.929 |
| 1-Hexene content © | N/A | 0.24 mole % 0.72 wt % | N/A | ND |
| Tensile Strength, Yield, MPa | 20.4 | 18.5 | 22 | 20.4 |
| Tensile Strength, Break, MPa | 61.8 | 59.3 | 41.7 | 39.9 |
| Elongation, % | 252 | 313 | 287 | 345 |
| Izod Impact, kJ/m$^2$ | 76 | 81 | 55.3 | 90.6 |
| Tensile Impact, kJ/m$^2$ | 2910 | 2940 | 1890 | 2400 |
| Flexural Modulus, MPa | 543 | 509 | 712 | 606 |
| Flexural Strength, MPa | 650 | 643 | 712 | 606 |

TABLE 2-continued

| Property | Run 201 (homo- polymer) | Run 202 (copolymer) | Commercial Sample A[a] | Commercial Sample B[b] |
|---|---|---|---|---|
| Sand Wheel Abrasion | 71 | 74 | 106 | 96 |

[a]Sample is 1900CM, made by Montell USA.
[b]Sample is GUR 4150, made by Hoechst Celanese USA.
© Sample analyzed by NMR spectroscopy
N/A = not available
ND = none detectable by NMR spectroscopy methods

TABLE 3

| Particle Size | Run 201 (homopolymer) | Run 202 (copolymer) | Commercial Sample A[a] | Commercial Sample B[b] |
|---|---|---|---|---|
| >354μ, wt % retained | 0.2 | 0.4 | 0.46 | 0.49 |
| >250μ, wt % retained | 2.0 | 2.8 | 56 | 8.9 |
| >177μ, wt % retained | 5.2 | 8.4 | 30 | 31.3 |
| >105μ, wt % retained | 21.2 | 34.0 | 12 | 45.6 |
| <105μ, wt % retained | 71.1 | 54.4 | 1 | 13.8 |

[a]Sample is 1900CM, made by Montell USA.
[b]Sample is GUR 4150, made by Hoechst Celanese USA.
N/A = not available The data demonstrate that acceptable homopolymers and ethylene/1-hexene copolymers can be produced using organo-zirconium catalyst systems and that 1-hexene is incorporated in to the comonomer.

Example 3

Ethylene copolymers were prepared under continuous particle form process conditions similar to Example 1 by contacting the catalyst system with ethylene and optionally a comonomer in a 1 gallon, jacketed, bench scale autoclave reactor. Isobutane was the diluent; hydrogen was not added to the reactor. Comonomer was added to the reactor in quantities shown in Table 4. The reactor was operated for a time of 60–75 minutes. Reactor temperature was 140° F. (60° C.) and total reactor pressure (isobutane plus ethylene) was 3.8 MPa (550 psig). Run 301 had 0.0148 g catalyst system and 50 g 1-hexene fed to the reactor; Run 302 had 0.0259 g catalyst system and 100 g 1-hexene fed to the reactor. Polymer fluff was removed from the reactor following polymerization for analysis. The catalyst systems used were commercially available catalyst systems purchased from W.R. Grace and Company, the Davison business unit, designated as Davison Sylopol® 5910, having an average particle size of 10 microns. Sales literature for Sylopol® 5910 provides a chemical analysis (weight percent) of 15.16% Cl, 4.44% Al, 2.95% Mg, 0.60% Ti and a Mg/Ti molar ratio of 9.69. Generally, the catalyst system is a silica-supported Ziegler-Natta catalyst, also described as a Ziegler-Natta catalyst deposited on silica. 0.5 ml of a 15 weight percent solution of triethylaluminum (TEA) cocatalyst was added to the reactor. The results of these runs are given below in Table 4.

TABLE 4

| Run | 301 | 302 |
|---|---|---|
| Ethylene Conc. (wt %) | 0.65 | 2.0 |
| Density (g/cc) | 0.926 | 0.927 |
| Bulk Density (g/cc) | 0.36 | 0.31 |
| Tensile Strength, Yield, MPa | 22.0 | 20.3 |
| Tensile Strength, Break, MPa | 56.2 | 46.9 |
| Elongation, % | 271 | 262 |
| Izod Impact, kJ/m$^2$ | 57 | 75 |
| Shore D Hardness | 68 | 66 |
| Sand Wheel Abrasion | 109 | 85 |
| Finer than 200 mesh (wt %) | 69.0 | 29.4 |
| Larger than 35 mesh (wt %) | 0.32 | 0.9 |
| Activity (ppm Ti) | 9.7 | 2.2 |

The data in Table 4 show that a supported titanium-containing catalyst system can produce ultrahigh molecular weight copolymers of ethylene and 1-hexene.

Size exclusion chromatography (SEC) results are shown in FIG. I. The curve designated as "Supported Titanium Catalyst System" is exemplary for ethylene/1-hexene copolymer products made in the above-described bench scale reactor. For the SEC run, reactor pressure was 250 psig, 0.0564 g catalyst system and 50 g 1-hexene were fed to the reactor. This, sample analyzed by SEC, had a weight average molecular weight ($M_w$) of about 2,640,000, a number average molecular weight ($M_n$) of about 227,000 and a calculated IV of about 15.4 dl/g. Note that the curve designated as a "Commercial Sample" had a similar SEC curve as that of the Supported Titanium Catalyst System sample. The sample also was analyzed by NMR techniques for 1-hexene content. 1-Hexene was present in the copolymer in 0.32 mole percent, or expressed in a different manner, in 0.95 weight percent.

While this invention has been described in detail for the purpose of illustration, it is not to be construed as limited thereby but is intended to cover all changes and modifications within the spirit and scope thereof.

That which is claimed is:

1. A continuous loop slurry process producing polyethylene having an HLMI of 0 g/10 min in the form of particles having particle sizes in the range of about 40 to about 400 microns comprising contacting ethylene and optionally at least one comonomer selected from the group consisting of 1-butene and 1-hexene or mixtures thereof in a hydrocarbon diluent having three to four carbon atoms per molecule in a loop reactor under continuous slurry loop conditions with a catalyst system comprising particulate catalyst and an aluminum alkyl cocatalyst at a temperature in the range of about 150° F. to about 180° F., wherein the ethylene concentration in the reactor is in the range of about 2 to about 20 weight percent based on the weight of the total liquid content of the reactor and wherein the particulate catalyst comprises magnesium and titanium supported on an inorganic oxide, the particles of said particulate catalyst having a particle size in the range of 1 to 40 microns.

2. A process according to claim 1 wherein an polyethylene copolymer is produced.

3. A process according to claim 1 wherein the polymerization is conducted at a temperature in the range of about 160° F. to about 170° F.

4. A process according to claim 1 wherein the inorganic oxide consists essentially of silica.

5. A process according to claim 1 wherein the particles of said particulate catalyst have a particle size of less than 20 microns.

6. A process according to claim 1 wherein the particles of said particulate catalyst have a particle size in the range of 4 to 16 microns.

7. A process according to claim 1 wherein said cocatalyst comprises trimethylaluminum.

8. A process according to claim 1 wherein the aluminum alkyl cocatalyst is employed in an amount such that the amount of aluminum alkyl cocatalyst is about 5 to 500 mg per kg of the hydrocarbon diluent.

9. A process according to claim 1 wherein the polyethylene has a weight average molecular weight greater than two million.

10. A process according to claim 1 wherein the polyethylene has an inherent viscosity of at least 20 dL/g.

11. A continuous loop slurry process producing polyethylene having an HLMI of 0 g/10 min in the form of particles having particle sizes in the range of about 40 microns to about 400 microns comprising contacting ethylene and optionally at least one comonomer selected from the group consisting of 1-butene and 1-hexene or mixtures thereof in a hydrocarbon diluent having three to four carbon atoms per molecule in a loop reactor under continuous slurry loop conditions with a catalyst system comprising particulate catalyst at a temperature in the range of about 158° F. to about 212° F., wherein the ethylene concentration in the reactor is in the range of about 2 to about 20 weight percent based on the weight of the total liquid content of the reactor and wherein the particulate catalyst has a particle size in the range of 1 to 40 microns and comprises an organometallic compound selected from the group consisting of zirconium complexed with a beta-stable ligand and hafnium complexed with a beta-stable ligand, said organometallic compound being deposited on an aluminum-containing inorganic oxide.

12. A process according to claim 11 wherein the beta stable ligands are selected from the group consisting of benzyl, trimethylsilylmethyl, 1-methylene-1-naphthyl, and neopentyl and wherein the inorganic oxide consists essentially of alumina and wherein the total amount of hafnium and zirconium in the particulate catalyst is equal to about 0.1 to about 6 weight percent of the weight of the particulate catalyst.

13. A process according to claim 12 wherein the organometallic compound is zirconium tetrakis (trimethylsilylmethyl).

14. A process according to claim 11 wherein the particle size of the polyethylene particles that are produced is in the range of about 50 to about 400 microns.

15. A process according to claim 11 wherein a polyethylene copolymer is produced from ethylene and 1-hexene.

16. A process according to claim 11 wherein the particles of said particulate catalyst have a particle size of less than 20 microns.

17. A process according to claim 16 wherein the particles of said particulate catalyst have a particle size in the range of 4 to 16 microns.

18. A process according to claim 11 which produces a homopolymer of ethylene.

19. A process according to claim 13 wherein the polyethylene has an inherent viscosity of at least 20 dL/g and a weight average molecular weight greater than two million.

20. A continuous loop slurry process producing polyethylene having an HLMI of 0 g/10 min in the form of particles having particle sizes in the range of about 40 to about 400 microns, comprising contacting ethylene and optionally at least one comonomer selected from the group consisting of 1-butene and 1-hexene or mixtures thereof in a hydrocarbon diluent having three to four carbon atoms per molecule in a loop reactor under continuous slurry loop conditions with a catalyst system comprising particulate catalyst wherein the ethylene concentration in the polymerization reactor flash gas is in the range of about 5 to about 12 weight percent and wherein the particulate catalyst has a particle size in the range of 1 to 40 microns and is selected from (a) particulate catalyst comprising an organometallic compound selected from the group consisting of zirconium complexed with a beta-stable ligand and hafnium complexed with a beta-stable ligand deposited on an aluminum-containing inorganic oxide; and (b) particulate catalyst comprising magnesium and titanium supported on an inorganic oxide, wherein the temperature of polymerization with catalysts of group (a) is in the range of about 150° F. to about 212° F. and with catalysts of group (b) in the range of about 150° F. to about 180° F.

* * * * *